(12) United States Patent
Watanabe et al.

(10) Patent No.: US 11,524,504 B2
(45) Date of Patent: Dec. 13, 2022

(54) PRINTING APPARATUS, SERVICE PROVIDING SYSTEM, AND PRINTING APPARATUS CONTROL METHOD

(71) Applicant: SEIKO EPSON CORPORATION, Tokyo (JP)

(72) Inventors: Ikumi Watanabe, Shiojiri (JP); Mikio Nagahara, Alexandra View (SG); Satoshi Jobetto, Shiojiri (JP); Hiroshi Kaiho, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/082,637

(22) Filed: Oct. 28, 2020

(65) Prior Publication Data
US 2021/0122165 A1 Apr. 29, 2021

(30) Foreign Application Priority Data

Oct. 29, 2019 (JP) .............................. JP2019-195973

(51) Int. Cl.
*B41J 2/175* (2006.01)
*H04N 1/34* (2006.01)
*G06F 3/12* (2006.01)
*B41J 29/393* (2006.01)

(52) U.S. Cl.
CPC ........ *B41J 2/17566* (2013.01); *G06F 3/1229* (2013.01); *G06F 3/1239* (2013.01); *H04N 1/344* (2013.01); *H04N 1/346* (2013.01); *B41J 2002/17569* (2013.01); *B41J 2002/17589* (2013.01); *B41J 2029/3937* (2013.01)

(58) Field of Classification Search
CPC .......... B41J 2/17566; B41J 2029/3937; H04N 1/344; G06F 3/1229; G06F 3/1239; G06Q 30/06
See application file for complete search history.

(56) References Cited

U.S. PATENT DOCUMENTS

| 9,081,521 B2 * | 7/2015 | Murthy ................. G06F 3/1287 |
| 2002/0042747 A1 * | 4/2002 | Istvan ................... G06F 3/1204 705/26.41 |
| 2011/0057971 A1 * | 3/2011 | Yokoyama .......... B41J 2/17566 347/7 |
| 2013/0286428 A1 | 10/2013 | Oleinik et al. |
| 2018/0267756 A1 | 9/2018 | Lee |

FOREIGN PATENT DOCUMENTS

| CN | 110635934 A | * 12/2019 | .......... G06F 3/1236 |
| JP | 2012-088552 | 5/2012 | |

* cited by examiner

*Primary Examiner* — Sharon Polk
(74) *Attorney, Agent, or Firm* — Workman Nydegger

(57) ABSTRACT

A service printer includes a printer printing unit that executes a print function, a scanning unit that executes a scan function, a printer communication unit that acquires, from a service providing server that provides a delivery service of delivering ink, status information indicating at least one of the status of a contract for use of the delivery service and the status of payment of the usage fee for the delivery service, and a printer controller that enables or disables execution of the print function and execution of the scan function based on at least one of the contract status and the payment status that are indicated by the status information acquired by the printer communication unit.

9 Claims, 10 Drawing Sheets

FIG. 4

| 113F | 114A | 114B | 114C |
|---|---|---|---|
| SERIAL NUMBER | INK AMOUNT INFORMATION | TOTAL PRINTED SHEET NUMBER INFORMATION | LOG FILE |

114

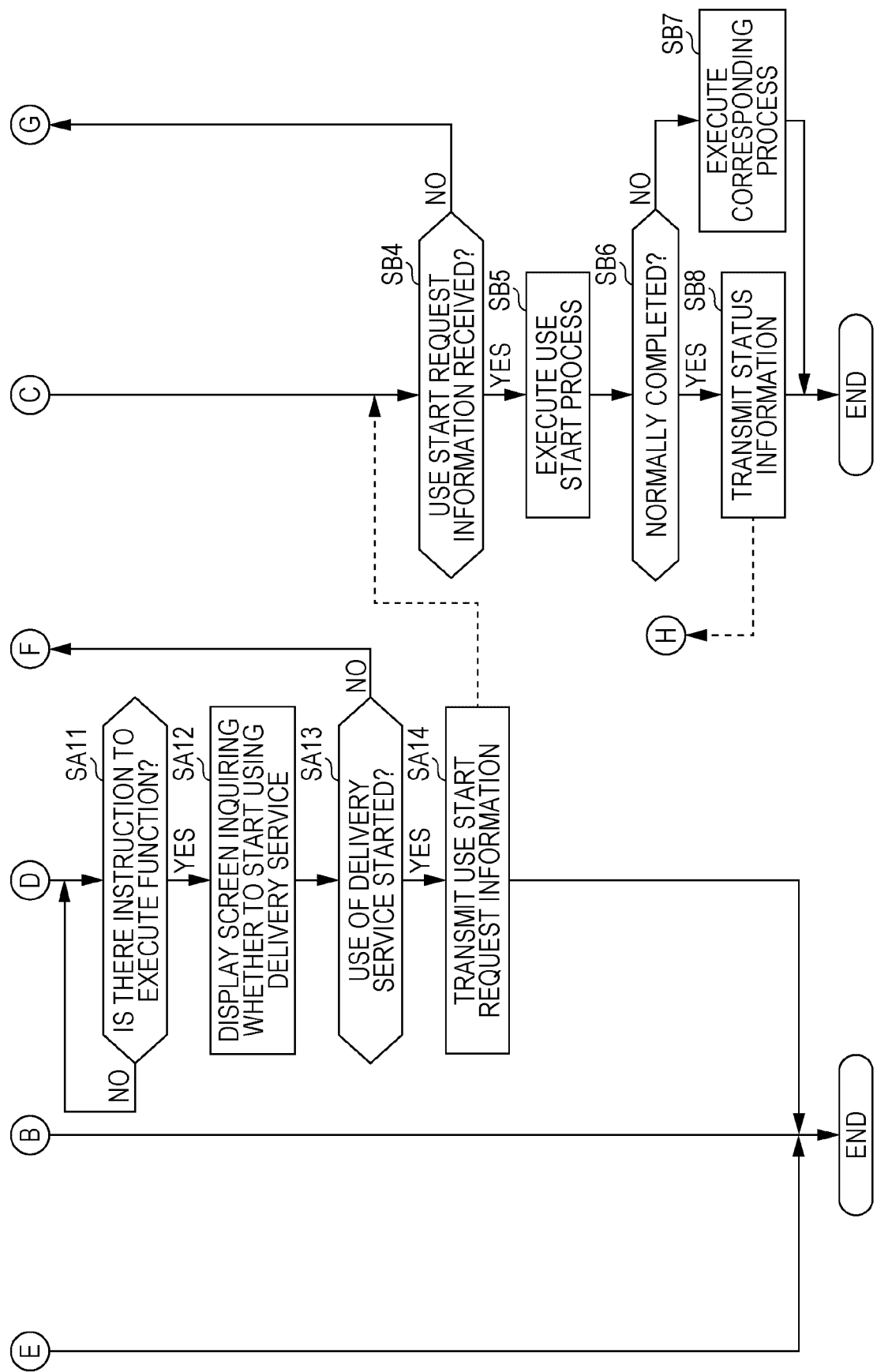

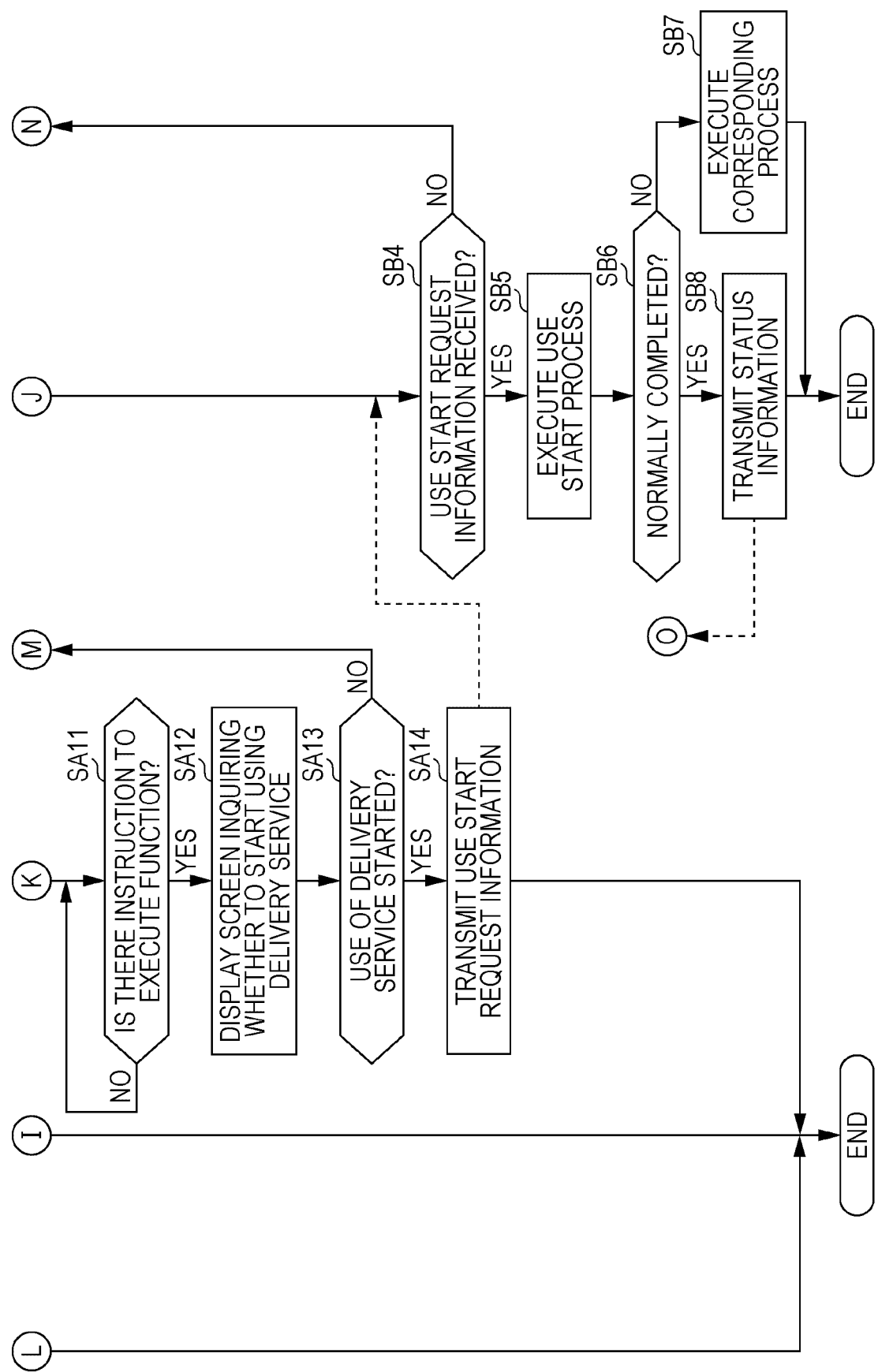

PRINTING APPARATUS, SERVICE PROVIDING SYSTEM, AND PRINTING APPARATUS CONTROL METHOD

The present application is based on, and claims priority from JP Application Serial Number 2019-195973, filed Oct. 29, 2019, the disclosure of which is hereby incorporated by reference herein in its entirety.

BACKGROUND

1. Technical Field

The present disclosure relates to a printing apparatus, a service providing system, and a printing apparatus control method.

2. Related Art

In the related art, a delivery service of delivering consumable items in a printing apparatus is known. For example, JP-A-2012-88552 discloses a service in which toner is delivered as needed without a user purchasing a toner cartridge.

However, the delivery service in the related art does not have a mechanism to set the operation of the printing apparatus according to at least one of the status of the contract for use of the delivery service and the status of payment of the usage fee for the delivery service. Therefore, in the delivery service in the related art, the printing apparatus may not be able to properly operate according to the above situation.

SUMMARY

According to an aspect of the present disclosure, a printing apparatus includes a first function unit that executes a first function using a consumable item, a second function unit that executes a second function without using the consumable item, an acquisition unit that acquires status information indicating at least one of a status of a contract for use of the delivery service and a status of payment of a usage fee for the delivery service from an information processing apparatus that provides a delivery service of delivering the consumable item, a controller that enables or disables execution by the first function unit of the first function and execution by the second function unit of the second function based on at least one of the contract status and the payment status that are indicated by the status information acquired by the acquisition unit.

In the above printing apparatus, when the contract status indicated by the status information acquired by the acquisition unit is uncontracted or suspended, the controller may disable execution by the first function unit of the first function.

In the above printing apparatus, when the payment status indicated by the status information acquired by the acquisition unit is unpaid, the controller may disable execution by the first function unit of the first function.

In the above printing apparatus, when the delivery service is a first delivery service of delivering the consumable item in the printing apparatus lent to a user, the controller may disable execution by the second function unit of the second function.

In the above printing apparatus, when the delivery service is a second delivery service of delivering the consumable item in the printing apparatus purchased by a user, the controller may enable execution by the second function unit of the second function.

In the above printing apparatus, the consumable item may be ink.

In the above printing apparatus, the first function may be a print function of printing an image of image data generated by a control device that controls the printing apparatus, and wherein the controller may disable the print function and may enable a maintenance function related to maintenance of the printing apparatus using the consumable item.

The above printing apparatus may further include an ink jet head, wherein the maintenance function may be a function related to maintenance of the ink jet head.

In the above printing apparatus, the maintenance function may be a function related to maintenance of a connection to a network to which the information processing apparatus is connected.

According to another aspect of the present disclosure, a service providing system includes a printing apparatus, and an information processing apparatus that provides a delivery service of delivering a consumable item in the printing apparatus, wherein the information processing apparatus includes an information processing apparatus communication unit that communicates with the printing apparatus, and an information processing apparatus controller that transmits, to the printing apparatus through the information processing apparatus communication unit, status information indicating at least one of a status of a contract for use of the delivery service and a status of payment of a usage fee for the delivery service, and wherein the printing apparatus includes a first function unit that executes a first function using the consumable item, a second function unit that executes a second function without using the consumable item, a printing apparatus communication unit that receives the status information from the information processing apparatus, and a controller that receives the status information from the information processing apparatus through the printing apparatus communication unit, and that enables or disables execution by the first function unit of the first function and execution by the second function unit of the second function based on at least one of the contract status and the payment status that are indicated by the received status information.

According to still another aspect of the present disclosure, in a method of controlling a printing apparatus including a first function unit that executes a first function using a consumable item, and a second function unit that executes a second function without using the consumable item, the method includes acquiring status information indicating at least one of a status of a contract for use of the delivery service and a status of payment of a usage fee for the delivery service from an information processing apparatus that provides a delivery service of delivering the consumable item, and enabling or disabling execution by the first function unit of the first function and execution by the second function unit of the second function based on at least one of the contract status and the payment status that are indicated by the acquired status information.

BRIEF DESCRIPTION OF THE DRAWINGS

FIG. 4 is a diagram illustrating an example of a printer management database.

FIGS. 6A and 6B are a flowchart showing the operation of a first printer and the service providing server.

FIGS. 7A and 7B are a flowchart showing the operation of a second printer and the service providing server.

DESCRIPTION OF EXEMPLARY EMBODIMENTS

Figure 1:
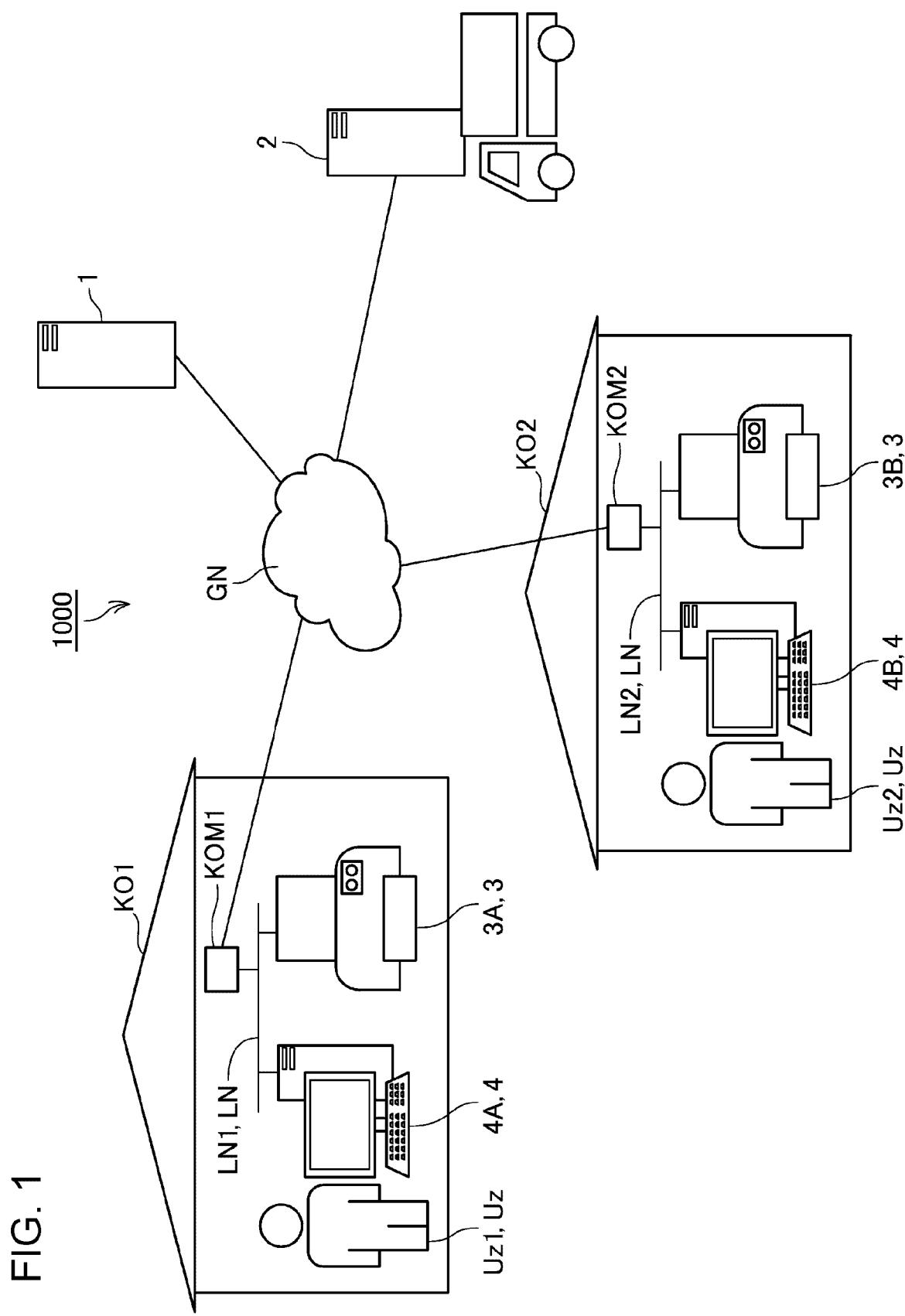
FIG. 1 is a diagram showing a configuration of a service providing system.

FIG. 1 is a diagram showing a configuration of a service providing system 1000. The service providing system 1000 is a system that provides a delivery service of delivering consumable items for a printer. The delivery service is a service in which a user Uz who makes a contract for use of the delivery service pays a usage fee for the use of the delivery service for a given period. This is a so-called subscription type service.

In the present embodiment, the service providing system 1000 provides two types of delivery services, a first delivery service and a second delivery service. The first delivery service and the second delivery service will be described later.

The service providing system 1000 includes a service providing server 1. The service providing server 1 corresponds to an example of an information processing apparatus. The service providing server 1 is a server apparatus that provides a delivery service. The service providing server 1 is connected to a global network GN including the Internet, a telephone network, and other communication networks, and communicates with devices connected to the global network GN. The global network GN corresponds to an example of a network. The service providing server 1 is owned by, for example, a main entity such as a company that runs the delivery service. Although the service providing server 1 is represented by one block in each figure, this does not necessarily mean that the service providing server 1 is configured by a single server apparatus. For example, the service providing server 1 may be configured to include a plurality of server apparatus having different processing contents.

The service providing system 1000 includes a delivery server 2. The delivery server 2 is a server apparatus that instructs a delivery person to deliver a delivery items. The delivery server 2 is owned by, for example, a company that is entrusted with the delivery work by a company that runs the delivery service, and issues a delivery instruction to deliver the delivery item to a delivery person who is an employee of the entrusted company. The delivery server 2 is connected to the global network GN and communicates with a device connected to the global network GN. In the present embodiment, the delivery items instructed by the delivery server 2 for delivery are different between the first delivery service and the second delivery service. The first delivery service is a service in which the user rents a printer, and a consumable item used in the rented printer is delivered. The delivery items in the first delivery service are the printer used in the first delivery service, and the consumable item for the printer. The second delivery service is a service in which a consumable item used in a printer purchased by a user at a store or the like is delivered. The delivery item in the second delivery service is the consumable item for the printer used in the second delivery service. In this embodiment, the ink is illustrated as a consumable item for the printer. Although the delivery server 2 is represented by one block in each figure, this does not necessarily mean that the delivery server 2 is configured by a single server apparatus. For example, the delivery server 2 may be configured to include a plurality of server apparatus having different processing contents.

In the following description, the printer used in the first delivery service will be referred to as a "first printer" and will be denoted by the symbol "3A". Further, the printer used in the second delivery service is referred to as a "second printer" and will be denoted by the symbol "3B". The first printer 3A is a property of the main entity that runs the delivery service. On the other hand, the second printer 3B is a printer purchased by a user of the first delivery service at a store or the like, and is a property of the user. Further, in the following description, when the first printer 3A and the second printer 3B are collectively referred to without distinction, they each are referred to as a "service printer" and will be denoted by the symbol "3". The service printer 3 corresponds to an example of a printing apparatus.

The service providing system 1000 includes one or more service printers 3. In this embodiment, the case where the service providing system 1000 includes one first printer 3A and one second printer 3B is illustrated. Further, in each figure, the case where the first printer 3A is delivered to a house KO1 according to the delivery instruction by the delivery server 2 is shown.

The first printer 3A is a continuous ink supply system (CISS) type printing apparatus in which an ink tank 322A that supplies the ink to an ink jet head 321A can be separately filled with the ink. The second printer 3B is a printing apparatus in which an ink cartridge 322B that supplies the ink to an ink jet head 321B is mounted, and the ink is supplied from the mounted the ink cartridge 322B to perform printing.

The first printer 3A is connected to a local network LN1 laid in the house KO1, and communicates with a device connected to the global network GN via a house communication device KOM1 connected to the local network LN1. Further, the first printer 3A communicates with a terminal device 4A connected to the local network LN1. The second printer 3B is connected to a local network LN2 laid in a house KO2, and communicates with a device connected to the global network GN via a house communication device KOM2 connected to the local network LN2. The second printer 3B also communicates with a terminal device 4B connected to the local network LN2.

The house communication devices KOM1 and KOM2 are interface devices that connect the local network LN and the global network GN. The house communication devices KOM1 and KOM2 have a function related to a modem or an optical network unit (ONU), a router function, a network address translation (NAT) function, a dynamic host configuration protocol (DHCP) server function, and the like. The house communication devices KOM1 and KOM2 transfer data transmitted and received between the devices when the communication is performed between the device connected to the local network LN and the device connected to the global network GN. In each figure, the house communication devices KOM1 and KOM2 are represented by one block, but the house communication devices KOM1 and KOM2 may have a configuration having a plurality of devices according to functions.

The service providing system 1000 includes two terminal devices 4 which are the terminal devices 4A and 4B. The terminal device 4 corresponds to an example of a control device. The service providing system 1000 may include more terminal devices 4. The terminal device 4A is a computer. The terminal device 4A is connected to the local network LN1, and communicates with the first printer 3A connected to the local network LN1 and a device connected to the global network GN. The terminal device 4B is a computer. The terminal device 4B is connected to the local network LN2, and communicates with the second printer 3B connected to the local network LN2 and a device connected to the global network GN.

The terminal device 4 shown in FIG. 1 exemplifies a desktop computer, but it may be a laptop computer or a tablet computer. When the terminal device 4 can be connected to the global network GN without via the local network LN, the terminal device 4 may communicate with a device connected to the global network GN without via the local network LN. Further, the terminal device 4 may communicate with the corresponding service printer 3 by a one-to-one communication method. An example of this communication method is a direct communication method in which wireless communication is performed without via an access point such as Wi-Fi Direct. Wi-Fi is a registered trademark.

In the present embodiment, a user Uz1 is a user of the first delivery service. The user Uz1 is the user Uz who owns the terminal device 4A.

In the first delivery service, the first printer 3A and the ink consumed by the first printer 3A are delivered to the delivery destination designated by the user. In the first delivery service, the ink, which is stored in an ink bottle, is delivered. In the first delivery service, the ink cartridge 322B is not delivered, unlike the second delivery service. In FIG. 1, in the first delivery service, the first printer 3A is delivered by the main entity that owns the delivery server 2 to the house KO1 designated by the user Uz1 as the delivery destination. As described above, the first printer 3A is a property of the main entity that runs the delivery service, and is not a property of the user Uz1. Therefore, the delivered first printer 3A is a printer that the main entity lends to the user Uz1. In the first delivery service, in addition to the first printer 3A, the ink consumed by the first printer 3A is delivered by the main entity that owns the delivery server 2.

In the present embodiment, a user Uz2 is a user of the second delivery service. The user Uz2 is the user Uz who owns the terminal device 4B.

In the second delivery service, the ink consumed by the second printer 3B purchased by the user is delivered to the delivery destination designated by the user of the second delivery service. In the second delivery service, the ink cartridge 322B which is filled with the ink is delivered. In FIG. 1, in the second delivery service, the ink cartridge 322B that can be attached to the second printer 3B is delivered to the house KO2 designated by the user Uz2 as the delivery destination by the main entity that owns the delivery server 2.

In this embodiment, the case where the number of users of the first delivery service is one is illustrated, but there may be a plurality of users of the first delivery service. The same applies to the second delivery service. Further, the user of the delivery service is not limited to a person, but may be the main entity such as a company.

Figure 2:
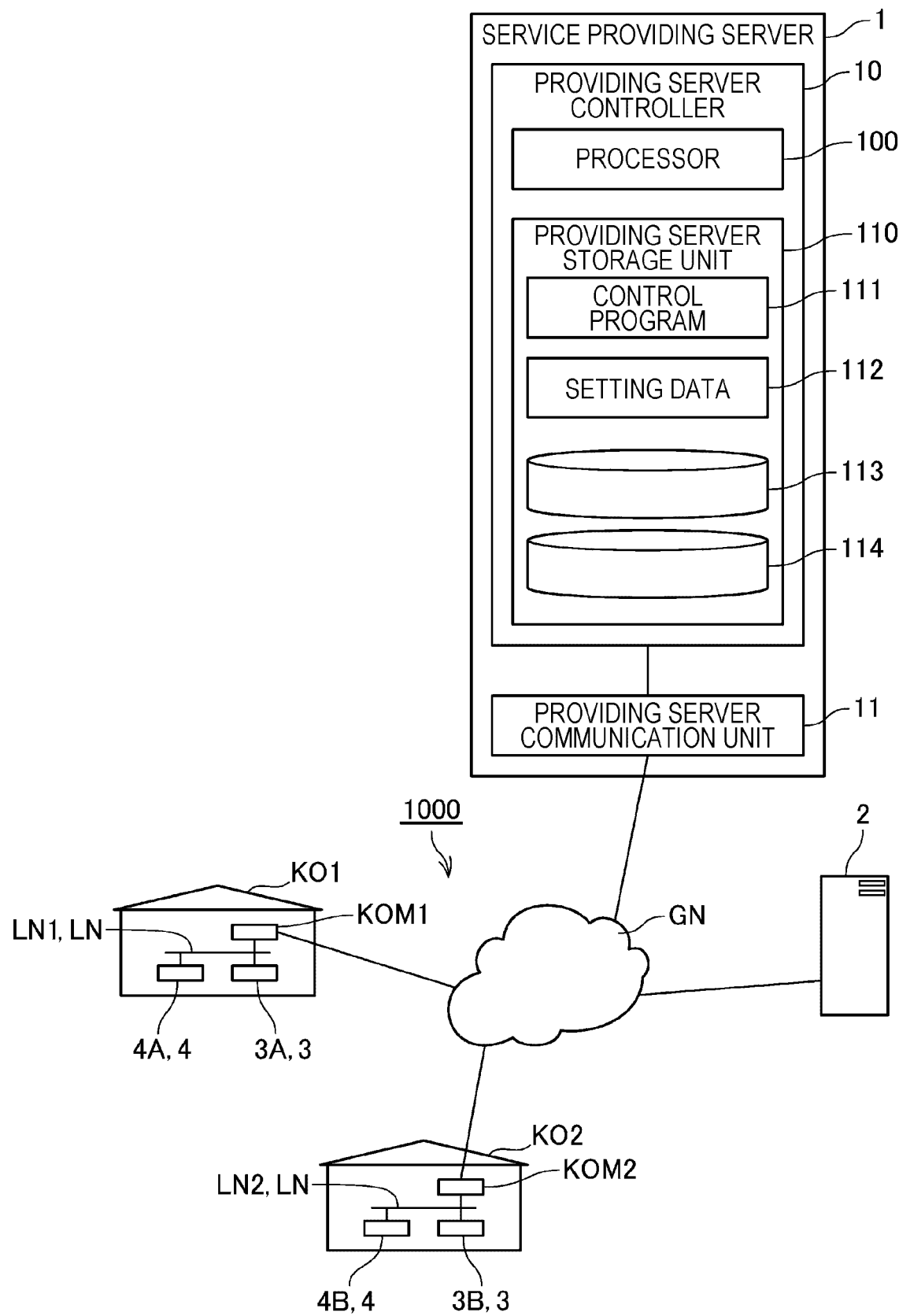
FIG. 2 is a block diagram showing a functional configuration of a service providing server.

Next, a functional configuration of each device of the service providing system 1000 will be described. First, the functional configuration of the service providing server 1 will be described. FIG. 2 is a block diagram showing a functional configuration of the service providing server 1.

The service providing server 1 includes a providing server controller 10. The providing server controller 10 corresponds to an example of an information processing apparatus controller. The providing server controller 10 includes a processor 100 that executes programs such as a CPU and an MPU, and a providing server storage unit 110, and controls respective units of the service providing server 1. The providing server controller 10 performs various processes in cooperation with hardware and software so that the processor 100 reads a control program 111 stored in the providing server storage unit 110 and executes the processes.

The providing server storage unit 110 has a storage area in which a program executed by the processor 100 and data processed by the processor 100 stored. The providing server storage unit 110 stores the control program 111 executed by the processor 100 and setting data 112 including various setting values related to the operation of the service providing server 1. The providing server storage unit 110 has a nonvolatile storage area in which programs and data are stored in a nonvolatile manner. Further, the providing server storage unit 110 may include a volatile storage area and may be configured to temporarily store a program executed by the processor 100 and data to be processed.

The providing server storage unit 110 stores an account management database 113 and a printer management database 114 in addition to the control program 111 and the setting data 112.

First, the account management database 113 will be described. The account management database 113 is a database that manages the account given to a member of the delivery service provided by the service providing server 1.

Figure 3:
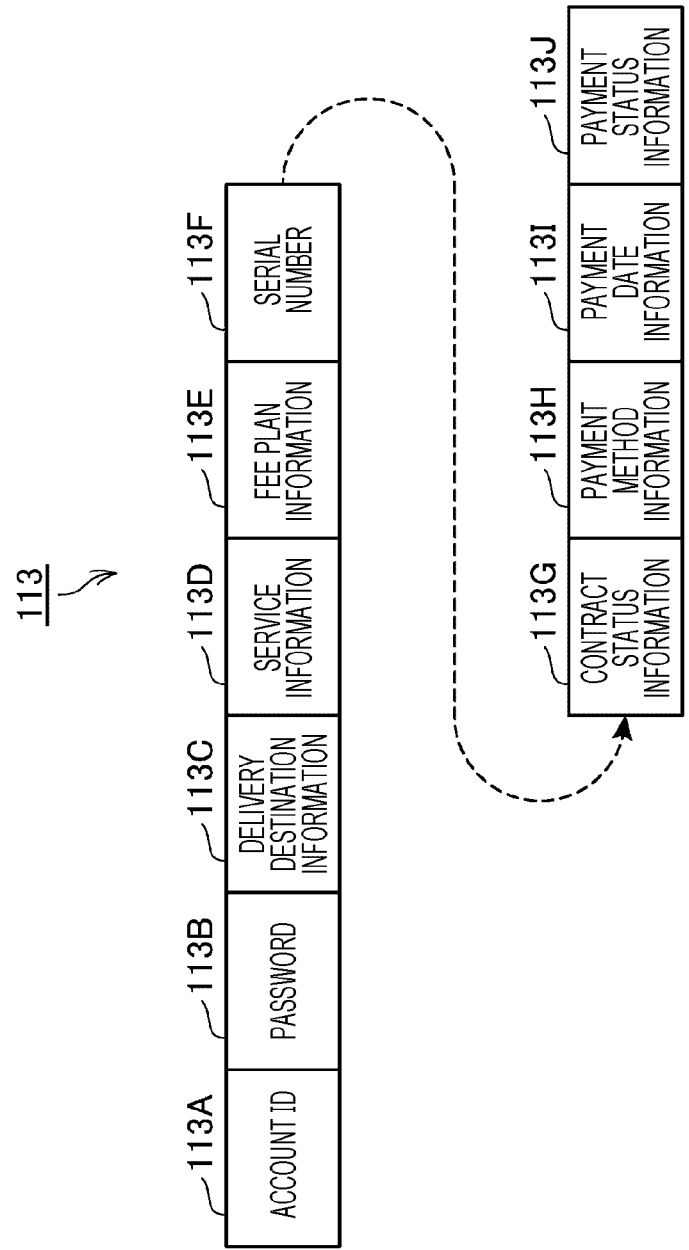
FIG. 3 is a diagram showing an example of an account management database.

FIG. 3 is a diagram schematically showing information included in one record of the account management database 113. As shown in FIG. 3, one record of the account management database 113 includes an account ID 113A, a password 113B, delivery destination information 113C, service information 113D, fee plan information 113E, a serial number 113F, contract status information 113G, payment method information 113H, payment date information 113I, and payment status information 113J.

The account ID 113A is identification information for identifying an account given to a member of the delivery service. For example, when the user Uz performs a membership registration of the delivery service, the account ID 113A is automatically assigned to the account given to the user Uz.

The password 113B is authentication information for authenticating the account. For example, when the user Uz performs a membership registration of the delivery service, the password 113B is set by the user Uz.

The delivery destination information 113C is information indicating the delivery destination of the delivery item. In the first delivery service, the delivery destination information 113C indicates the delivery destination of the ink consumed by the first printer 3A and the first printer 3A. In the second delivery service, the delivery destination information 113C indicates the delivery destination of the ink consumed by the second printer 3B. For example, the delivery destination information 113C is set by the user Uz when the user Uz performs a membership registration of the delivery service. The delivery destination information 113C can be changed even after it is stored in the account management database 113, that is, even after the membership registration of the delivery service is performed.

The service information 113D is information indicating either the first delivery service or the second delivery service. For example, the service information 113D is set by the user Uz when the user Uz performs a membership registration of the delivery service.

The fee plan information 113E is information indicating a fee plan. The fee plan defines at least the usage fee paid by the user of the delivery service for a given period and the number of print media on which printing by the service printer 3 can be performed without charge during the given period. In each of the first delivery service and the second delivery service, a plurality of fee plans for which the member of the delivery service can make a contract is set.

The serial number 113F is an identification number for identifying the service printer 3.

The contract status information 113G is information indicating the status of the contract for use of the delivery service. The contract for use of the delivery service is a contract made between the main entity providing the delivery service and the member of the delivery service. The contract status indicated by the contract status information 113G is one of "under contract", "uncontracted", and "suspended". The term "under contract" refers to a status in which the member of the delivery service has made a contract to use the delivery service with a main entity that provides the delivery service. The term "uncontracted" about the contract status refers to a status in which the member of the delivery service does not have a contract with the main entity that provides the delivery service. The term "suspended" refers to a status in which a member of the delivery service has made a contract not to use the delivery service temporarily with the main entity that provides the delivery service. The providing server controller 10 updates the contract status information 113G at appropriate timing.

The payment method information 113H is information indicating how to pay the usage fee of the delivery service. For example, when the payment method information 113H indicates a payment method using a credit card, the payment method information 113H includes a combination of information indicating that the payment is mad by a credit card and a credit card number. For example, the payment method information 113H is set by the user Uz when the user Uz performs a membership registration of the delivery service. As in the delivery destination information 113C, the payment method information 113H can be changed even after the membership registration of the delivery service.

The payment date information 113I is information indicating the payment date of the usage fee of the delivery service. Since the delivery service is a subscription-type service, the payment date indicated by the payment date information 113I is indicated in a form of, for example, on which day of every month the payment is to be made. For example, the payment date information 113I indicates the payment date in the form of on which day of every month the payment is to be made with the day when the use of the service printer 3 is started as a starting point.

The payment status information 113J is information indicating the status of payment of the usage fee of the delivery service. The payment status indicated by the payment status information 113J is either paid or unpaid. On the payment date indicated by the payment date information 113I, the providing server controller 10 makes an inquiry of the main entity acting on behalf of paying the usage fee, acquires the payment status from the main entity, and updates the payment status information 113J as appropriate. Further, when a providing server communication unit 11 receives the use start request information from the service printer 3, the providing server controller 10 inquires of the main entity acting on behalf of paying the usage fee about the payment status to update the payment status information 113J as appropriate. The providing server communication unit 11 corresponds to an example of the information processing apparatus communication unit.

Next, the printer management database 114 will be described. The printer management database 114 is a database that manages the service printer 3.

FIG. 4 is a diagram schematically showing information included in one record of the printer management database 114. As shown in FIG. 4, one record of the printer management database 114 includes the serial number 113F, ink amount information 114A, total printed sheet number information 114B, and a log file 114C.

The ink amount information 114A is information indicating the total amount of ink used after the first printer 3A is delivered when the service printer 3 indicated by the associated serial number 113F is the first printer 3A. In the following description, the total amount of ink used after the first printer 3A is delivered is referred to as a "total ink use amount". On the other hand, the ink amount information 114A is information indicating the remaining amount of ink of the delivered ink cartridge 322B when the service printer 3 indicated by the associated serial number 113F is the second printer 3B. The total ink use amount or the ink remaining amount indicated by the ink amount information 114A is appropriately updated by the providing server controller 10.

The total printed sheet number information 114B is information indicating the total number of print media on which the service printer 3 performs printing during a given period defined by the fee plan. For example, when the given period defined by the fee plan is one month, the total printed sheet number information 114B is information indicating the total number of print media on which the service printer 3 has performed printing in one month. The total printed sheet number information 114B is updated as appropriate by the providing server controller 10. Further, the total number of print media indicated by the total printed sheet number information 114B is reset to zero when the usage fee is paid on the payment date indicated by the payment date information 113I.

The log file 114C is a file in which log information is described. The log information is a log of a plurality of monitoring items. The monitoring item is an item which is predetermined to monitor the status of the service printer 3 and to make a log. For example, there is a monitoring item of a printer error, as the monitoring item. As a log of the monitoring item, that is, as a log of the printer error, information indicating that the printer error has occurred is recorded in time series together with information indicating the date and time in the log file 114C. The printer error refers to a status in which normal printing cannot be performed, such as a state of abnormality of the ink jet head.

Returning to the description of FIG. 2, the service providing server 1 includes the providing server communication unit 11. The providing server communication unit 11 includes communication hardware according to a predetermined communication standard, and under the control of the providing server controller 10, communicates with devices connected to the global network GN according to the predetermined communication standard. The devices connected to the global network GN here include the service printer 3, the terminal device 4, and the delivery server 2.

Next, the functional configurations of the first printer 3A, the second printer 3B, and the terminal device 4 will be described. Since the terminal devices 4A and 4B have the same configuration, the terminal device 4A will be described as a representative, and the description and illustration of the terminal device 4B will be omitted.

The first printer 3A includes a first printer controller 30A. The first printer controller 30A corresponds to an example of a controller. The first printer controller 30A includes a processor 300A that executes programs such as a CPU and an MPU, and a first printer storage unit 310A, and controls respective units of the first printer 3A. The first printer controller 30A performs various processes in cooperation with hardware and software so that the processor 300A reads a control program 311A stored in the first printer storage unit 310A and executes the processes.

The first printer storage unit 310A has a storage area in which a program executed by the processor 300A and data processed by the processor 300A is stored. The first printer storage unit 310A stores the control program 311A executed by the processor 300A and setting data 312A including various setting values related to the operation of the first printer 3A. The first printer storage unit 310A has a non-volatile storage area in which programs and data are stored in a nonvolatile manner. Further, the first printer storage unit 310A may include a volatile storage area and may be configured to temporarily store a program executed by the processor 300A and data to be processed.

The first printer storage unit 310A stores the serial number 113F, total ink use amount information 313A, printed sheet number information 314A, and the log file 114C in addition to the control program 311A and the setting data 312A.

The total ink use amount information 313A is information indicating the total amount of ink used by the first printer 3A after the first printer 3A is delivered. The first printer controller 30A adds the ink amount used for printing to the total ink use amount indicated by the total ink use amount information 313A stored in the first printer storage unit 310A each time printing is performed to calculate the total use amount of ink at the end of printing. Then, the first printer controller 30A updates the total ink use amount indicated by the total ink use amount information 313A stored in the first printer storage unit 310A to the calculated total ink use amount.

The printed sheet number information 314A indicates the number of print media printed by the service printer 3 until when the printer information is transmitted to the service providing server 1 next time from when the printer information was transmitted to the service providing server 1 last time. The printer information will be described later. When the first printer controller 30A transmits the printer information to the service providing server 1, the first printer controller 30A resets the number of printed sheets indicated by the printed sheet number information 314A to zero. In addition, the first printer controller 30A cumulatively counts the number of printed sheets each time printing is performed until the printer information is transmitted to update the printed sheet number information 314A stored in the first printer storage unit 310A to the printed sheet number information 314A indicating the number of printed sheets after counting.

As described above, the log file 114C is a file in which log information is described. The first printer controller 30A monitors whether a printer error has occurred, and records the log of the monitoring item, that is, the log of the printer error, in the log file 114C based on the monitoring result.

The first printer 3A includes a first printer communication unit 31A. The first printer communication unit 31A corresponds to an example of an acquisition unit and a printing apparatus communication unit. The first printer communication unit 31A is composed of communication hardware according to a predetermined communication standard, and under the control of the first printer controller 30A, communicates with devices connected to the local network LN1 and the global network GN according to the predetermined communication standard. In the present embodiment, the device connected to the local network LN1 with which the first printer communication unit 31A communicates is the terminal device 4A. Further, in this embodiment, the device connected to the global network GN with which the first printer communication unit 31A communicates is the service providing server 1.

The first printer 3A includes a first printer printing unit 32A. The first printer printing unit 32A corresponds to an example of a first function unit. The first printer printing unit 32A has a configuration related to a printing system including the ink jet head 321A that ejects the ink onto a print medium to form dots, a carriage that operates the ink jet head 321A in the scanning direction, a carriage drive motor that drives the carriage, a transport unit that transports the print medium, the ink tank 322A from which the ink is delivered to the ink jet head 321A, a maintenance mechanism that maintains the ink jet head 321A, and the like.

The first printer printing unit 32A executes the print function of consuming the ink under the control of the first printer controller 30A. The print function corresponds to an example of a first function. The print function is a print function of printing an image of the image data generated by the terminal device 4. Further, the first printer printing unit 32A executes a maintenance function of maintaining the first printer 3A under the control of the first printer controller 30A. The maintenance function includes a head maintenance function of maintaining the ink jet head 321A and a network maintenance function related to maintenance of a connection to the global network GN.

The first printer printing unit 32A prints an image of the image data generated by the terminal device 4 on a print medium by executing a print function under the control of the first printer controller 30A.

Further, the first printer printing unit 32A performs cleaning as a head maintenance function under the control of the first printer controller 30A. The cleaning is a function of forcibly sucking the ink stored in the cavity of the nozzle in order to prevent an ejection failure due to an increase in viscosity of ink stored in the cavity of the nozzle of the ink jet head 321A from occurring over time.

Further, the first printer printing unit 32A executes a function of printing an image showing a network diagnosis result on a print medium as a network maintenance function under the control of the first printer controller 30A.

The first printer 3A includes a first printer scanning unit 33A. The first printer scanning unit 33A corresponds to an example of a second function unit. The first printer scanning unit 33A has a configuration related to reading, such as a scanner that reads a character or an image recorded on a document, and executes a scan function under the control of the first printer controller 30A. The scan function corresponds to an example of a second function. When the first printer scanning unit 33A executes the scan function, for example, the first printer scanning unit 33A reads the character or the image recorded by applying the light emitted from the light source to the document to output the data obtained by the reading to the first printer controller 30A. The first printer controller 30A performs data processing such as RGB conversion processing and compression processing on the data input from the first printer scanning unit 33A to generate the data in a predetermined format. Then, the first printer controller 30A stores the generated data in the predetermined format in the first printer storage unit 310A.

A first printer input unit 34A includes an operation switch provided on the first printer 3A, and an input section such as a touch panel, and detects an operation performed by the user Uz on the input section to output the detected operation to the first printer controller 30A. The first printer controller 30A performs the process corresponding to the operation on the input section based on the input from the first printer input unit 34A.

A first printer display unit 35A includes an LED, a display panel, and the like, and under the control of the first printer controller 30A, turns on/blinks/turns off the LED in a predetermined mode, and displays information on the display panel, and the like.

The terminal device 4A includes a terminal controller 40. The terminal controller 40 includes a processor 400 that executes programs such as a CPU and an MPU, and a terminal storage unit 410, and controls respective units of the terminal device 4A. The terminal controller 40 executes various processes by cooperation of hardware and software so that the processor 400 reads a control program 411 stored in the terminal storage unit 410 and executes the process.

A printer driver 413 is installed in the terminal device 4A at predetermined timing. The terminal controller 40 functions as a driver execution unit 401 by the processor 400 reading and executing the printer driver 413. In addition, a dedicated application 414, which is a dedicated application program for using the delivery service, is installed in the terminal device 4A. The terminal controller 40 functions as a dedicated application execution unit 402 by the processor 400 reading and executing the dedicated application 414. Functions of the driver execution unit 401 and the dedicated application execution unit 402 will be described later.

The terminal storage unit 410 has a storage area in which a program executed by the processor 400 and data processed by the processor 400 is stored. The terminal storage unit 410 stores the control program 411 executed by the processor 400, setting data 412 including various setting values related to the operation of the terminal device 4A, the printer driver 413, the dedicated application 414, and various pieces of data. The terminal storage unit 410 has a nonvolatile storage area in which programs and data are stored in a nonvolatile manner. Further, the terminal storage unit 410 may have a volatile storage area and may be configured to temporarily store a program executed by the processor 400 and data to be processed.

The terminal device 4A includes a terminal communication unit 41. The terminal communication unit 41 includes communication hardware according to a predetermined communication standard, and under the control of the terminal controller 40, communicates with devices connected to the local network LN and the global network GN according to the predetermined communication standard. In the present embodiment, the device connected to the local network LN with which the terminal communication unit 41 communicates is the service printer 3. In the terminal device 4A, the terminal communication unit 41 communicates with the first printer 3A connected to the local network LN1. In the terminal device 4B, the terminal communication unit 41 communicates with the second printer 3B connected to the local network LN2. Further, in the present embodiment, the device connected to the global network GN with which the terminal communication unit 41 communicates is the service providing server 1.

The terminal device 4A includes a terminal input unit 42. The terminal input unit 42 includes a keyboard, a mouse, and another input section, and detects a user operation on the input section to output the detected operation to the terminal controller 40. The terminal controller 40 executes a process corresponding to the user operation on the input section based on the input from the terminal input unit 42.

The terminal device 4A includes a terminal display unit 43. The terminal display unit 43 includes a display panel, and displays various pieces of information on the display panel under the control of the terminal controller 40.

As described above, the terminal controller 40 functions as the driver execution unit 401 and the dedicated application execution unit 402.

The driver execution unit 401 generates, based on the image data generated by the predetermined application program, print data for causing the service printer 3 to print the image indicated by the image data. The print data includes various control commands corresponding to the command system of the service printer 3. The driver execution unit 401 transmits the generated print data to the service printer 3 through the terminal communication unit 41. In the terminal device 4A, the driver execution unit 401 transmits print data corresponding to the command system of the first printer 3A to the first printer 3A. In the terminal device 4B, the driver execution unit 401 transmits print data corresponding to the command system of the second printer 3B to the second printer 3B.

The dedicated application execution unit 402 executes the process related to a membership registration of the delivery service, a change in membership registration, and a request for withdrawal from the delivery service.

The dedicated application execution unit 402 displays, on the terminal display unit 43, a user interface for performing a membership registration of the delivery service, that is, a user interface for performing joining to the delivery service. At least the password 113B, the delivery destination information 113C, the service information 113D, the fee plan information 113E, and the payment method information 113H can be input to the user interface. The dedicated application execution unit 402 transmits various pieces of information input to the user interface to the service providing server 1 through the terminal communication unit 41. The service providing server 1 stores a record including various received information in the account management database 113 to perform a membership registration.

Further, the dedicated application execution unit 402 displays, on the terminal display unit 43, a user interface for changing the membership registration of the delivery service. It should be noted that changing the membership registration of the delivery service means changing the contents of the record stored in the account management database 113. When changing the membership registration, for example, the delivery destination information 113C and the payment method information 113H can be changed. The account ID 113A, the password 113B, and the information to be changed can be input to the user interface. The dedicated application execution unit 402 transmits various pieces of information input to the user interface to the service providing server 1 through the terminal communication unit 41. The service providing server 1 updates the information included in the records stored in the account management database 113 based on the received various pieces of information.

The dedicated application execution unit 402 displays, on the terminal display unit 43, a user interface for making a request for withdrawal from the delivery service. The dedicated application execution unit 402 receives the withdrawal request by the user Uz by displaying the user interface on the terminal display unit 43. Various pieces of information can be input to the user interface for making a withdrawal request. The dedicated application execution unit 402 transmits various pieces of information input to the user interface to the service providing server 1 through the terminal communication unit 41.

The second printer 3B includes a second printer controller 30B. The second printer controller 30B corresponds to an example of a controller. The second printer controller 30B includes a processor 300B that executes programs such as a CPU and an MPU, and a second printer storage unit 310B, and controls respective units of the second printer 3B. The second printer controller 30B performs various processes in cooperation with hardware and software so that the processor 300B reads a control program 311B stored in the second printer storage unit 310B and executes the processes. In the following description, when the first printer controller 30A and the second printer controller 30B are collectively referred to without distinction, they each are referred to as a "printer controller" and will be denoted by the symbol "30".

The second printer storage unit 310B has a storage area in which a program executed by the processor 300B and data processed by the processor 300B is stored. The second printer storage unit 310B stores the control program 311B executed by the processor 300B and setting data 312B including various setting values related to the operation of the second printer 3B. The second printer storage unit 310B has a nonvolatile storage area in which programs and data are stored in a non-volatile manner. Further, the second printer storage unit 310B may include a volatile storage area and may be configured to temporarily store a program executed by the processor 300B and data to be processed.

The second printer storage unit 310B stores the serial number 113F, the printed sheet number information 314A, and the log file 114C in addition to the control program 311A and the setting data 312A.

When the second printer controller 30B transmits the printer information to the service providing server 1, the second printer controller 30B resets the number of printed sheets indicated by the printed sheet number information 314A to zero. In addition, the second printer controller 30B cumulatively counts the number of printed sheets each time printing is performed until the printer information is transmitted to update the printed sheet number information 314A stored in the second printer storage unit 310B to the printed sheet number information 314A indicating the number of printed sheets after counting.

The second printer controller 30B monitors whether a printer error has occurred, and records the log of the monitoring item, that is, the log of the printer error, in the log file 114C based on the monitoring result.

The second printer 3B includes a second printer communication unit 31B. The second printer communication unit 31B corresponds to an example of an acquisition unit and a printing apparatus communication unit. The second printer communication unit 31B is composed of communication hardware according to a predetermined communication standard, and under the control of the second printer controller 30B, communicates with devices connected to the local network LN2 and the global network GN according to the predetermined communication standard. In the present embodiment, the device connected to the local network LN2 with which the second printer communication unit 31B communicates is the terminal device 4B. Further, in the present embodiment, the device connected to the global network GN with which the second printer communication unit 31B communicates is the service providing server 1. In the following description, when the first printer communication unit 31A and the second printer communication unit 31B are collectively referred to without distinction, they each are referred to as a "printer communication unit" and will be denoted by the symbol "31".

The second printer 3B includes a second printer printing unit 32B. The second printer printing unit 32B corresponds to an example of a first function unit. The second printer printing unit 32B has a configuration related to a printing system including the ink jet head 321B that ejects the ink onto a print medium to form dots, a carriage that operates the ink jet head 321B in the scanning direction, a carriage drive motor that drives the carriage, a transport unit that transports the print medium, the ink cartridge 322B from which the ink is delivered to the ink jet head 321B, a maintenance mechanism that maintains the ink jet head 321B, and the like. In the following description, when the first printer printing unit 32A and the second printer printing unit 32B are collectively referred to without distinction, they each are referred to as a "printing unit" and will be denoted by the symbol "32".

As in first printer printing unit 32A, the second printer printing unit 32B executes the print function and the maintenance function including the head maintenance function and the network maintenance function under the control of the second printer controller 30B.

The second printer 3B includes a second printer scanning unit 33B. The second printer scanning unit 33B corresponds to an example of a second function unit. The second printer scanning unit 33B has a configuration related to reading, such as a scanner that reads a character or an image recorded on a document, and executes a scan function under the control of the second printer controller 30B. When the second printer scanning unit 33B executes the scan function, for example, the second printer scanning unit 33B reads the character or the image recorded by applying the light emitted from the light source to the document to output the data obtained by the reading to the second printer controller 30B. The second printer controller 30B performs data processing such as RGB conversion processing and compression processing on the data input from the second printer scanning unit 33B to generate the data in a predetermined format. Then, the second printer controller 30B stores the generated data in the predetermined format in the second printer storage unit 310B. In the following description, when the first printer scanning unit 33A and the second printer scanning unit 33B are collectively referred to without distinction, they each are referred to as a "scanning unit" and will be denoted by the symbol "33".

A second printer input unit 34B includes an operation switch provided on the second printer 3B, and an input section such as a touch panel, and detects an operation performed by the user Uz on the input section to output the detected operation to the second printer controller 30B. The second printer controller 30B executes a process corresponding to the operation on the input section based on the input from the second printer input unit 34B.

A second printer display unit 35B includes an LED, a display panel, and the like, and under the control of the second printer controller 30B, turns on/blinks/turns off the LED in a predetermined mode, and displays information on the display panel, and the like.

Here, operations of the service printer 3 and the service providing server 1 related to the ink delivery will be described.

A printer controller 30 determines whether a trigger for transmitting printer information has occurred. Examples of the trigger include occurrences that the power is turned on, that a predetermined period has elapsed, that printing has ended, and the like.

The printer information is information about the service printer 3. In the first printer 3A, the printer information includes the serial number 113F, total ink use amount information 313A, the printed sheet number information 314A, and the log file 114C which are stored in the first printer storage unit 310A. In the second printer 3B, the printer information includes the serial number 113F, the printed sheet number information 314A, and the log file 114C which are stored in the second printer storage unit 310B, and ink remaining amount information 323B recorded in an IC chip of the ink cartridge 322B.

When determining that a trigger has occurred, the printer controller 30 transmits printer information to the service providing server 1 through the printer communication unit 31.

Upon receiving the printer information, the providing server controller 10 of the service providing server 1 determines, based on the total ink use amount information 313A or the ink remaining amount information 323B included in the printer information, whether the ink is required to deliver. When determining that the ink is required to deliver, the providing server controller 10 makes a delivery request to the delivery server 2 to cause the main entity that owns the delivery server 2 to deliver the ink.

In addition, the providing server controller 10 updates the record of the printer management database 114 based on the received printer information. That is, the providing server controller 10 updates the ink amount information 114A included in the record to the total ink use amount information 313A or the ink remaining amount information 323B included in the received printer information. Further, the providing server controller 10 adds the number of printed sheets indicated by the printed sheet number information 314A included in the received printer information to the total number of printed sheets indicated by the total printed sheet number information 114B included in the record to update the total printed sheet number information 114B included in the record. The providing server controller 10 updates the log file 114C included in the record to the log file 114C included in the received printer information.

In this way, in the service providing system 1000, when a trigger for transmitting printer information occurs, the service printer 3 transmits the printer information to the service providing server 1, and makes a delivery request to the delivery server 2 based on the printer information received by the service providing server 1. Here, it is desired for the ink not to be delivered according to the status of the contract for use of the delivery service and the status of payment of the usage fee. Therefore, the service printer 3 and the service providing server 1 execute the following operations.

Figure 6A:
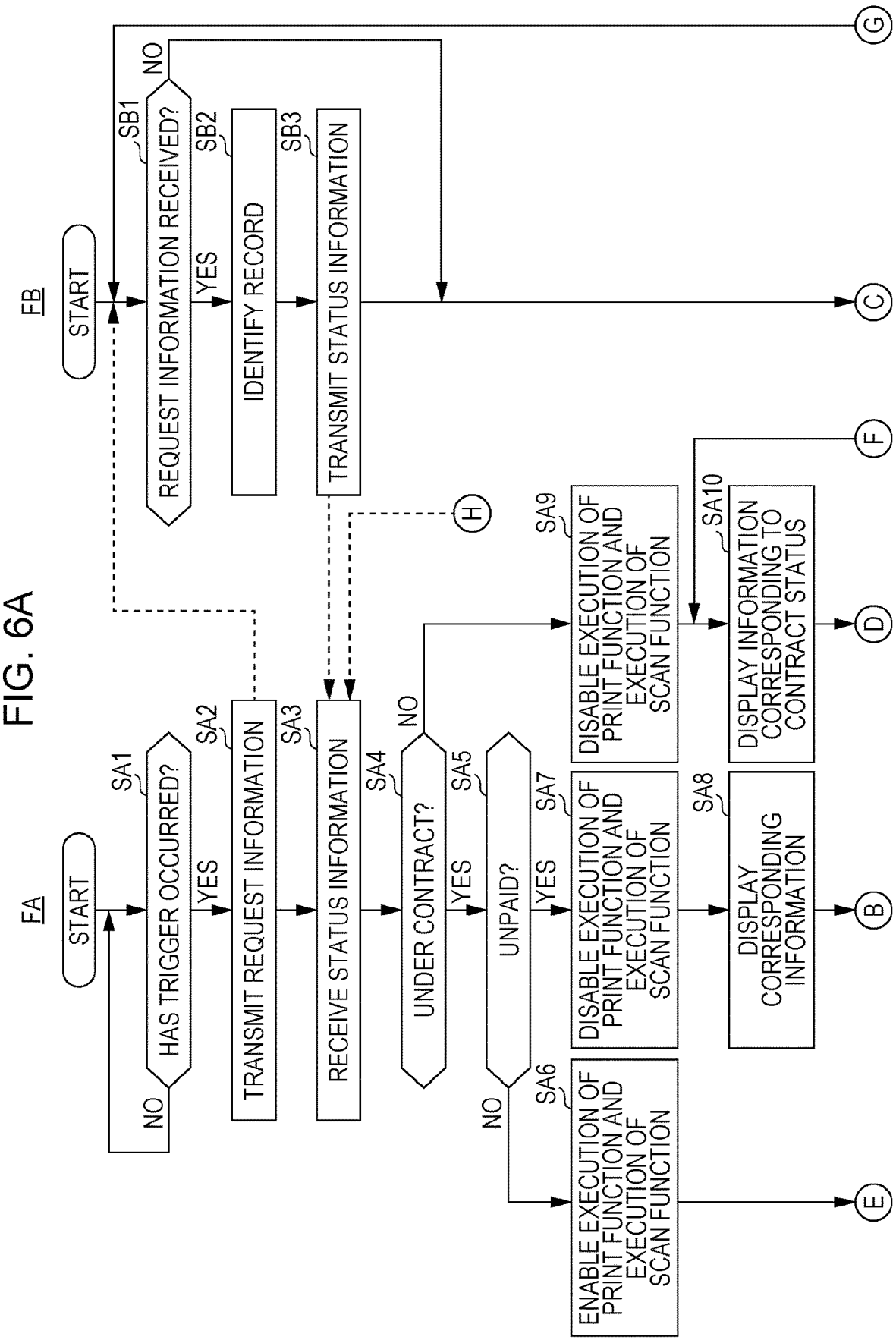

First, the operations of the first printer 3A and the service providing server 1 will be described. FIGS. 6A and 6B are a flowchart showing the operations of the first printer 3A and the service providing server 1. In FIGS. 6A and 6B, a flowchart FA shows the operation of the first printer 3A, and a flowchart FB shows the operation of the service providing server 1.

With reference to the flowchart FA, the first printer controller 30A of the first printer 3A determines whether a trigger requesting status information has occurred (step SA1).

The status information is information indicating at least one of the status of the contract for use of the delivery service and the status of payment of the usage fee, and both of them are shown in the present embodiment. The status information includes the contract status information 113G and the payment status information 113J.

For example, when the first printer 3A is powered on, the first printer controller 30A determines that a trigger requesting status information has occurred. Further, for example, when determining that it is the time of the predetermined cycle at which the status information is requested, the first printer controller 30A determines that the trigger requesting the status information has occurred. The trigger requesting the status information is not limited to these triggers. Further, the trigger requesting the status information is not limited to one type of trigger, and may include a plurality of types of triggers.

When determining that the trigger requesting the status information has occurred (step SA1: YES), the first printer controller 30A transmits, through the first printer communication unit 31A, request information requesting the status information to the service providing server 1 (step SA2). The request information transmitted to the service providing server 1 includes the serial number 113F of the first printer 3A transmitting the request information.

With reference to the flowchart FB, the providing server controller 10 of the service providing server 1 determines whether the providing server communication unit 11 has received the request information (step SB1).

When determining that the request information has not been received (step SB1: NO), the providing server controller 10 moves the process to step SB4.

Next, when determining that the request information has been received (step SB1: YES), the providing server controller 10 identifies, from the account management database 113, the record including the serial number 113F that matches the serial number 113F included in the received request information (step SB2).

Next, the providing server controller 10 transmits, to the first printer 3A through the providing server communication unit 11, the status information including the contract status information 113G and the payment status information 113J included in the record identified in step SB2 (step SB3).

Referring to the flowchart FA, the first printer controller 30A receives the status information through the first printer communication unit 31A (step SA3).

The first printer controller 30A determines whether the contract status indicated by the contract status information 113G included in the status information received in step SA3 is under contract (step SA4).

When determining that the contract status indicated by the contract status information 113G is under contract (step SA4: YES), the first printer controller 30A determines whether the payment status indicated by the payment status information 113J included in the status information received in step SA3 is unpaid (step SA5).

When determining that the payment status indicated by the payment status information 113J is not unpaid, that is, that the payment has been completed (step SA5: NO), the first printer controller 30A enables execution of the print function and execution of the scan function (step SA6).

The process of step SA6 will be described in detail. The setting data 312A of the first printer 3A includes a setting item for enabling or disabling execution of the print function and a setting item for enabling or disabling execution of the scan function. Further, the setting data 312A of the first printer 3A includes a setting item for enabling or disabling execution of the head maintenance function and a setting item for enabling or disabling execution of the network maintenance function. The setting value indicating "enabled" or the setting value indicating "disenabled" is associated with each of the above setting items. In step SA6, the first printer controller 30A enables execution of the print function, execution of the scan function, execution of the head maintenance function, and execution of the network maintenance function by associating the setting value indicating "enabled" with all the above setting items included in the setting data 312A.

When execution of the print function and execution of the scan function are enabled, the first printer 3A can execute the print function and the scan function. When execution of the head maintenance function and execution of the network maintenance function are enabled, the first printer 3A can execute the head maintenance function and the execute network maintenance function.

Returning to the explanation of step SA5, when determining that the payment status indicated by the payment status information 113J is unpaid (step SA5: YES), the first printer controller 30A disables execution of the print function and execution of the scan function (step SA7).

The process of step SA7 will be described in detail. In step SA7, the first printer controller 30A associates the setting value indicating "disenabled" on the setting item of the print function and the setting item of the scan function among the setting items of the setting data 312A. Here, the first printer controller 30A associates the setting value indicating "enabled" on the setting items of the head maintenance function and the network maintenance function. As a result, the first printer controller 30A disables execution of the print function and execution of the scan function.

When execution of the print function and execution of the scan function are disabled, the first printer 3A cannot execute the print function and cannot execute the scan function. On the other hand, the first printer 3A can execute the head maintenance function and the network maintenance function.

After performing the process of step SA7, the first printer controller 30A displays information corresponding to the process of step SA7 on the first printer display unit 35A (step SA8). For example, in step SA8, the first printer controller 30A displays, on the first printer display unit 35A, information indicating that the print function and the scan function can be executed by paying the usage fee.

Returning to the explanation of step SA4, when determining that the contract status indicated by the contract status information 113G included in the status information received in step SA3 does not indicate that the contract is underway, that is, when determining that the contract is either uncontracted or suspended (step SA4: NO), the first printer controller 30A disables execution of the print function and execution of the scan function (step SA9).

As in step SA7, in step SA9, the first printer controller 30A associates the setting value indicating "disenabled" on the setting item of the print function and the setting item of the scan function among the above setting items included in the setting data 312A. Further, the first printer controller 30A associates the setting value indicating "enabled" on the setting items of the head maintenance function and the network maintenance function.

When the first printer controller 30A disables execution of the print function and execution of the scan function, the first printer controller 30A displays information corresponding to the status of the contract for use of the delivery service on the first printer display unit 35A (step SA10).

For example, when the contract status is uncontracted, the first printer controller 30A displays, on the first printer display unit 35A, information indicating that the current contract status is uncontracted, and that the first printer 3A cannot be used. Also, for example, when the contract status is suspended, the first printer controller 30A displays, on the first printer display unit 35A, information indicating that the current contract status is suspended, and that the first printer 3A cannot be used.

Next, the first printer controller 30A determines whether there is an instruction to execute either the print function or the scan function (step SA11). For example, when the first printer input unit 34A detects an instruction to execute either the print function or the scan function, the first printer controller 30A makes a positive determination in step SA11. Further, for example, when the first printer communication unit 31A receives print data from the terminal device 4A, the first printer controller 30A makes a positive determination in step SA11.

When determining that there is an instruction to execute either the print function or the scan function (step SA11: YES), the first printer controller 30A displays, on the first printer display unit 35A, the screen inquiring of the user Uz1 whether the user starts use of the delivery service (step SA12).

Next, the first printer controller 30A determines whether use of the delivery service is started (step SA13). A software button for performing an instruction to start use of the delivery service and a software button for instructing not to start use of the delivery service are provided on the screen displayed in step SA12. In step SA13, the first printer controller 30A makes a determination according to the operated software button.

When determining that the use of the delivery service is not started (step SA13: NO), the first printer controller 30A returns the process to step SA10, and displays, on the first printer display unit 35A, information corresponding to the status of the contract for use of the delivery service again.

On the other hand, when determining that the use of the delivery service is started (step SA13: YES), the first printer controller 30A transmits, through the first printer communication unit 31A, the use start request information requesting the start of use of the delivery service to the service providing server 1 (step SA14).

The use start request information transmitted in step SA14 includes the serial number 113F stored in the first printer storage unit 310A.

With reference to the flowchart FB, the providing server controller 10 of the service providing server 1 determines whether the providing server communication unit 11 has received the use start request information (step SB4).

Next, when determining that the use start request information has been received (step SB4: YES), the providing server controller 10 performs the use start process for starting use of the delivery service based on the received use start request information (step SB5).

In the use start process, the providing server controller 10 identifies, from the account management database 113, a record including a serial number 113F that matches the serial number 113F included in the use start request information.

Next, when the contract status indicated by the contract status information 113G included in the identified record is uncontracted, the providing server controller 10 present the fee plan to the user Uz1, and afterwards, determines whether the usage fee defined by the fee plan selected by the user Uz1 has been paid. When receiving, from the main entity acting on behalf of paying the usage fee, the payment status indicating that the payment has been made, the providing server controller 10 determines that the usage fee has been paid, updates the contract status indicated by the contract status information 113G included in the identified record to "under contract", and in addition, updates the payment status indicated by the payment status information 113J included in the identified record to "paid". The providing server controller 10 determines that the use start process has been normally completed. On the other hand, when the providing server controller 10 cannot receive, from the main entity acting on behalf of paying the usage fee, the payment status indicating that payment has been made, or when the providing server controller 10 receives the payment status indicating unpaid, the providing server controller 10 determines that the usage fee has not been paid, and determines that the use start process has not been normally completed.

In addition, when the contract status indicated by the contract status information 113G included in the identified record is suspended, the providing server controller 10 determines whether the usage fee defined by the fee plan indicated by the fee plan information 113E included in the identified record has been paid. When receiving, from the main entity acting on behalf of paying the usage fee, the payment status indicating that the payment has been made, the providing server controller 10 determines that the usage fee has been paid, updates the contract status indicated by the contract status information 113G included in the identified record to "under contract", and in addition, updates the payment status indicated by the payment status information 113J included in the identified record to "paid". The providing server controller 10 determines that the use start process has been normally completed. On the other hand, when the providing server controller 10 cannot receive, from the main entity acting on behalf of paying the usage fee, the payment status indicating that payment has been made, or when the providing server controller 10 receives the payment status indicating unpaid, the providing server controller 10 determines that the usage fee has not been paid, and determines that the use start process has not been normally completed.

The providing server controller 10 determines whether the use start process is normally completed (step SB6), and when determining that the use start process is not normally completed (step SB6: NO), the providing server controller 10 executes the corresponding process (step SB7), and when determining that the process is normally completed (step SB6: YES), the providing server controller 10 transmits the status information to the first printer 3A (step SB8).

The status information transmitted in step SB8 is information including the contract status information 113G indicating that the contract is underway and the payment status information 113J indicating that payment has been completed. Therefore, upon receiving the status information in step SA3, the first printer controller 30A enables execution of the print function and execution of the scan function.

Figure 7A:
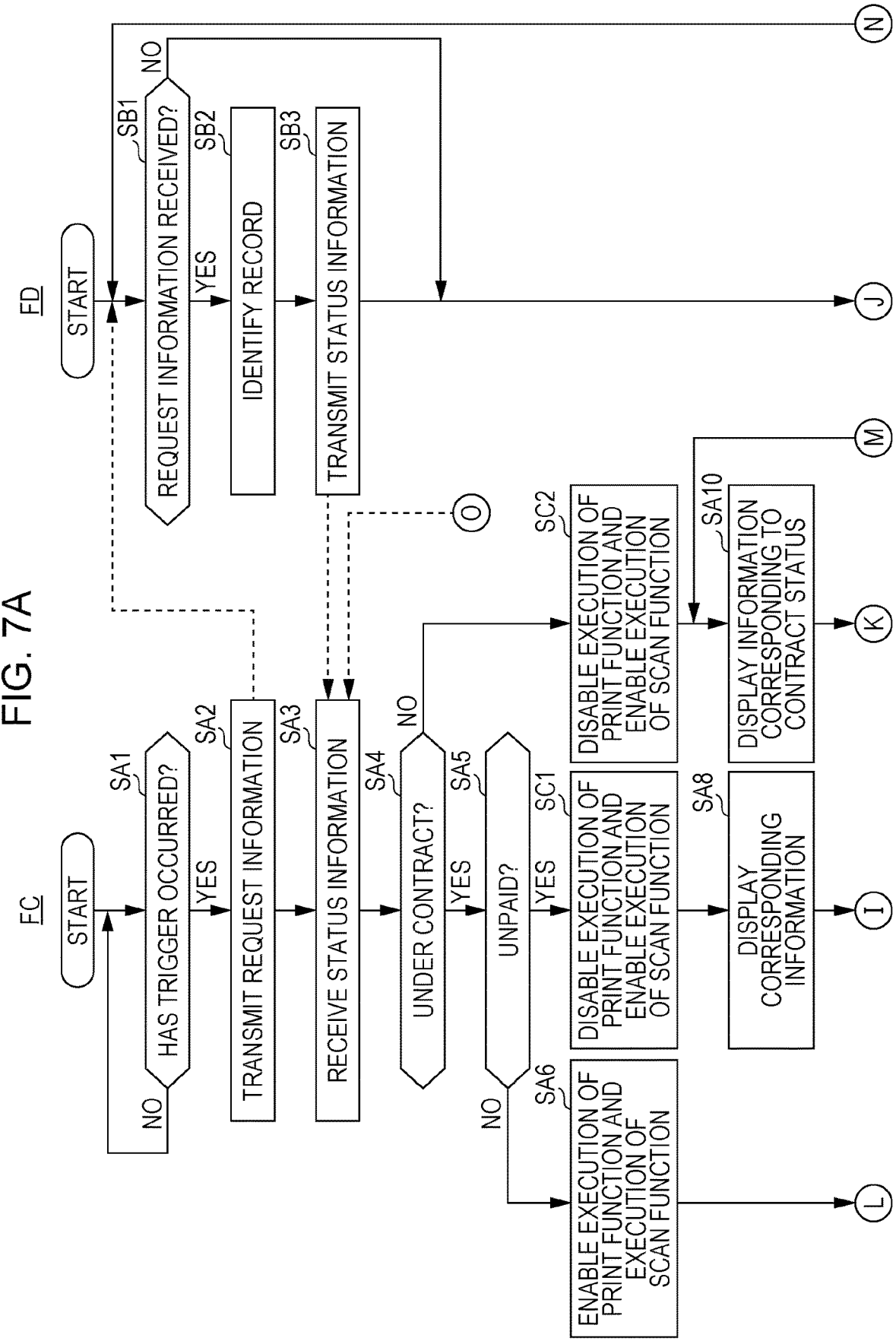

Next, operations of the second printer 3B and the service providing server 1 will be described. FIGS. 7A and 7B are a flowchart showing the operations of the second printer 3B and the service providing server 1. In FIGS. 7A and 7B, a flowchart FC shows the operation of the second printer 3B, and a flowchart FD shows the operation of the service providing server 1.

In the flowchart shown in FIGS. 7A and 7B, the steps same as those in the flowchart shown in FIGS. 6A and 6B are designated by the same step numbers, and detailed description thereof will be omitted. The main entity of the operation indicated by the flowchart FC is the second printer 3B.

When determining that the payment status indicated by the payment status information 113J is unpaid (step SA5: NO), the second printer controller 30B disables execution of the print function, and enables execution of the scan function (step SC1).

The process of step SC1 will be described in detail. As in setting data 312A, the setting data 312B of the second printer 3B includes a setting item for enabling or disabling execution of the print function and a setting item for enabling or disabling execution of the scan function. Further, the setting data 312B of the second printer 3B includes a setting item for enabling or disabling execution of the head maintenance function and a setting item for enabling or disabling execution of the network maintenance function.

In step SC1, the second printer controller 30B associates the setting value indicating "disenabled" on the setting item of the print function, and associates the setting value indicating "enabled" on the setting items of the scan function, the head maintenance function, and the network maintenance function among the above setting items included in the setting data 312B.

After the setting in step SC1, while the second printer 3B cannot execute the print function, the second printer 3B can execute the scan function, the head maintenance function, and the network maintenance function.

When determining that the contract status indicated by the contract status information 113G is uncontracted or suspended (step SA4: NO), the second printer controller 30B disables execution of the print function, and enables execution of the scan function (step SC2).

As in step SC1, in step SC2, the second printer controller 30B associates the setting value indicating "disenabled" on the setting item of the print function, and associates the setting value indicating "enabled" on the setting items of the scan function, the head maintenance function, and the network maintenance function among the above setting items included in the setting data 312B.

After the setting in step SC2, while the second printer 3B cannot execute the print function, the second printer 3B can execute the scan function, the head maintenance function, and the network maintenance function.

As mentioned above, the service printer 3 includes a printer printing unit 32 that executes a print function using the ink, a scanning unit 33 that executes a scan function, a printer communication unit 31 that acquires, from the service providing server 1 that provides the delivery service, status information indicating at least one of the status of a contract for use of the delivery service and the status of payment of a usage fee for the delivery service. In addition, the service printer 3 includes the printer controller 30 that enables or disables execution of the print function and execution of the scan function based on at least one of the contract status and the payment status indicated by the status information acquired by the printer communication unit 31.

In the method of controlling the service printer 3, status information is acquired from the service providing server 1, and execution of the print function and execution of the scan function are enabled or disabled based on at least one of the contract status and the payment status indicated by the acquired status information. The method of controlling the service printer 3 corresponds to an example of a method of controlling the printing apparatus.

The service providing system 1000 includes the service printer 3 and the service providing server 1. The service providing server 1 includes the providing server communication unit 11 that communicates with the service printer 3 and the providing server controller 10 that transmits status information to the service printer 3 through the providing server communication unit 11. The service printer 3 includes the printer printing unit 32 that executes a print function, the scanning unit 33 that executes a scan function, the printer communication unit 31 that receives status information from the service providing server 1, and the printer controller 30 that receives the status information from the service providing server 1 through the printer communication unit 31, and that enables or disables execution of the print function and execution of the scan function based on at least one of the contract status and the payment status indicated by the received status information.

According to the service printer 3, the control method of the service printer 3, and the service providing system 1000, according to at least one of the status of the contract for use of the delivery service and the status of payment of the usage fee, it is possible to appropriately set the function that the service printer 3 can execute and the function that the service printer 3 cannot execute. Therefore, according to the service printer 3, the control method of the service printer 3, and the service providing system 1000, it is possible to appropriately operate the service printer 3 in the delivery service.

When the contract status indicated by the status information acquired by the printer communication unit 31 is uncontracted or suspended, the printer controller 30 disables execution of the print function.

According to this since the service printer 3 does not consume the ink when the contract status is uncontracted or suspended, it is possible to prevent the ink from being delivered even when the contract status is uncontracted or suspended in the delivery service. Therefore, it is possible to appropriately restrict the operation of the service printer 3 according to the contract status, and to operate the service printer 3 more appropriately in the delivery service. Further, it is possible to differentiate the operation of the service printer 3 according to whether the contract status is under contract or uncontracted or suspended, and to secure the fairness among the members of the delivery service.

When the payment status indicated by the status information acquired by the printer communication unit 31 is unpaid, the printer controller 30 disables execution of the print function.

According to this since the service printer 3 does not consume the ink when the payment status is uncontracted or suspended, it is possible to prevent the ink from being delivered even when the payment status is unpaid in the delivery service. Therefore, it is possible to appropriately restrict the operation of the service printer 3 according to the payment status, and to operate the service printer 3 more appropriately in the delivery service. Further, it is possible to differentiate the operation of the service printer 3 according to whether the payment is paid or unpaid, and to secure the fairness among the members of the delivery service.

When the delivery service is the first delivery service of delivering the ink in the service printer 3 lent to the user Uz, the printer controller 30 disables execution of the scan function.

According to this, in the first delivery service, execution of the scan function in addition to the print function is disabled. As a result, it is possible to reliably prevent the service printer 3 that is not owned by the user Uz from being unnecessarily used regardless of the contract status and the payment status.

When the delivery service is the second delivery service of delivering the ink in the service printer 3 purchased by the user Uz, the printer controller 30 enables execution of the scan function.

In the second delivery service, the service printer 3 is the property of the user Uz. Therefore, execution of the scan function should not be disabled regardless of the status of the contract for use of the delivery service and the status of payment of the usage fee. Therefore, in the second delivery service, it is possible to appropriately restrict the operation of the service printer 3 by enabling execution of the scan function in consideration of the service printer 3 being owned by the user Uz.

The print function is a function of printing an image of the image data generated by the terminal device 4. The printer controller 30 disables execution of the print function, and enables the maintenance function of the service printer 3 that uses the ink.

As a result, since the maintenance function is not disabled, it is possible to execute the maintenance function regardless of the status of the contract for use of the delivery service and the status of payment of the usage fee. Therefore, maintenance of the service printer 3 can be performed even when the print function cannot be executed due to the status of the contract and the payment status of the usage fee, so that it is possible to prevent a problem from occurring in the service printer 3 during the period in which the print function cannot be executed.

The service printer 3 includes an ink jet head 321. The maintenance function is a function related to maintenance of the ink jet head 321.

As a result, the function related to maintenance of the ink jet head 321 is not disabled, so that it is possible to execute the function regardless of the contract status and the payment status. Therefore, maintenance of the ink jet head 321 can be performed even when the print function cannot be executed according to the contract status and the payment status, so that it is possible to prevent problems such as nozzle clogging from occurring in the ink jet head 321 during the period in which the print function cannot be executed.

The maintenance function is a function related to maintenance of the connection to the global network GN.

As a result, the function related to maintenance of the connection to the global network GN is not disabled, so that it is possible to execute the function regardless of the contract status and payment status. Therefore, maintenance of the connection to the global network GN can be performed even when the print function cannot be executed according to the contract status and payment status, so that it is possible to prevent a problem from occurring in the connection to the global network GN during the period in which the print function cannot be executed. Therefore, when use of the delivery service is started, it is possible to prevent a situation in which the delivery service cannot be started immediately due to a failure in the connection to the global network GN from occurring.

The embodiment described above is merely an aspect of the present disclosure, and any modification and application can be made within the scope of the present disclosure.

For example, in the above-described embodiment, the CISS type printer is illustrated as the first printer 3A, but the printer used in the first delivery service may be a printer to which the ink cartridge 322B can be attached. In this case, in the first delivery service, the ink cartridge type printer and the ink cartridge are delivered. Further, in the above-described embodiment, the cartridge type printer is illustrated as the second printer 3B, but the printer used in the second delivery service may be a CISS type printer. In this case, in the first delivery service, the ink bottle is delivered.

Further, for example, in the above-described embodiment, the case where the model of the printer used in each of the first delivery service and the second delivery service is different is illustrated, but the same model may be used. In this case, the service printer 3 manages by a flag or the like which printer of the printer used by the first delivery service and the printer used by the second delivery service the service printer 3 is, and performs the corresponding operation of the operations in FIGS. 6A and 6B or FIGS. 7A and 7B.

For example, in the above-described embodiment, the case where the ink is illustrated as a consumable item in the service printer 3, and the ink is delivered is illustrated. However, the consumable item to be delivered is not limited to the ink, and may include, for example, a waste liquid box that stores the ink that is discharged as waste liquid during maintenance of the ink jet head 321 or a print medium.

Further, for example, in the above-described embodiment, the print function is illustrated as the first function, but the first function is not limited to the print function and may be any function that uses a consumable item in the service printer 3. For example, when the consumable item is a waste liquid box or a print medium, the first function may be a function of discharging the waste liquid in the waste liquid box or a function of transporting the print medium. Further, although the scan function is illustrated as the second function, the second function is not limited to the scan function, and when the service printer 3 has another function such as a facsimile function, the second function unit may be the another function.

For example, in the above-described embodiment, the serial ink jet printer is illustrated as the service printer 3, but the service printer 3 may be a line-type ink jet printer.

For example, the functions of the providing server controller 10, the printer controller 30, and the terminal controller 40 may be implemented by a plurality of processors or semiconductor chips.

Figure 5A:
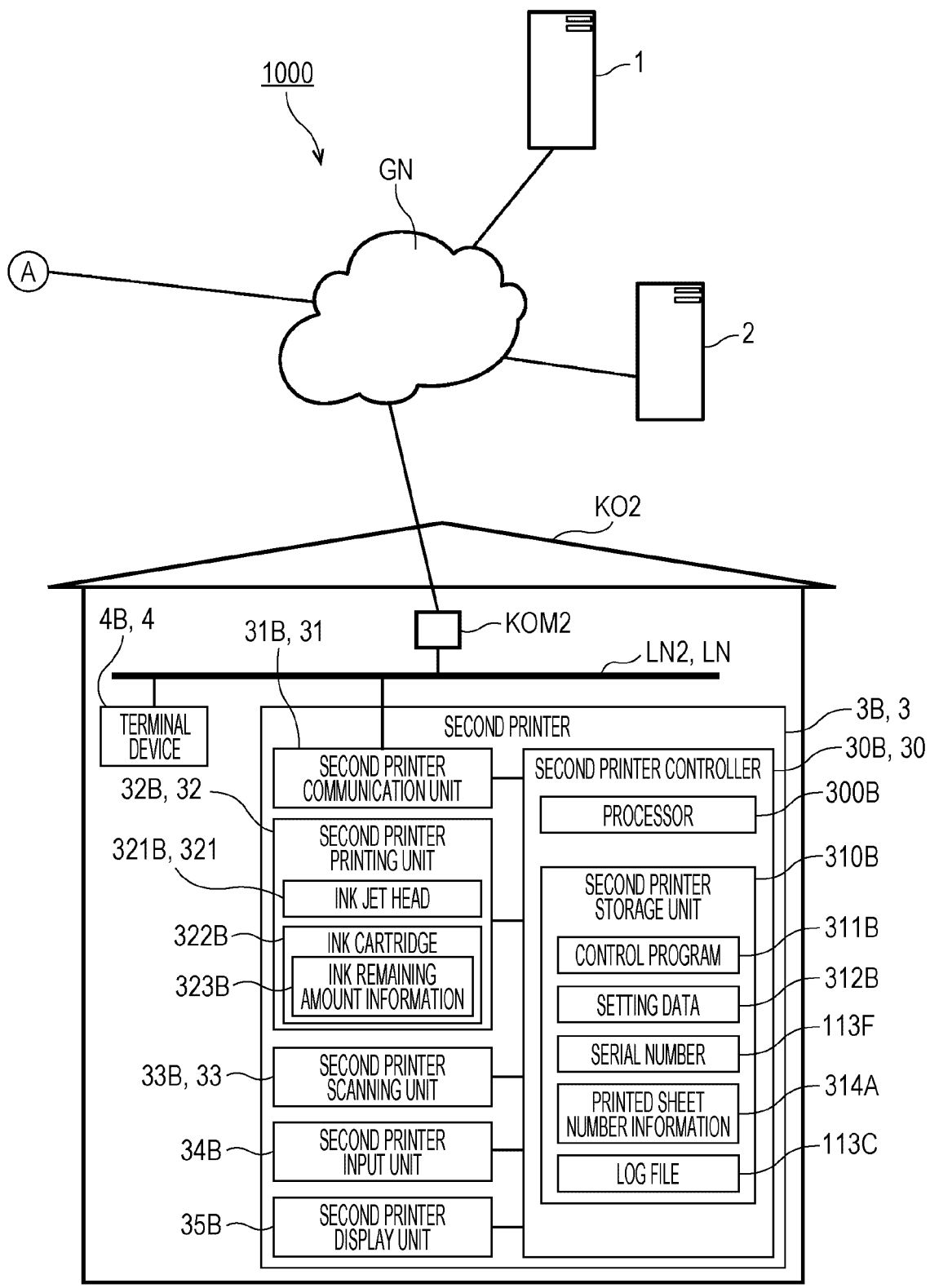
FIGS. 5A and 5B are a block diagram showing a functional configuration of a service printer and a terminal device.
Figure 5B:
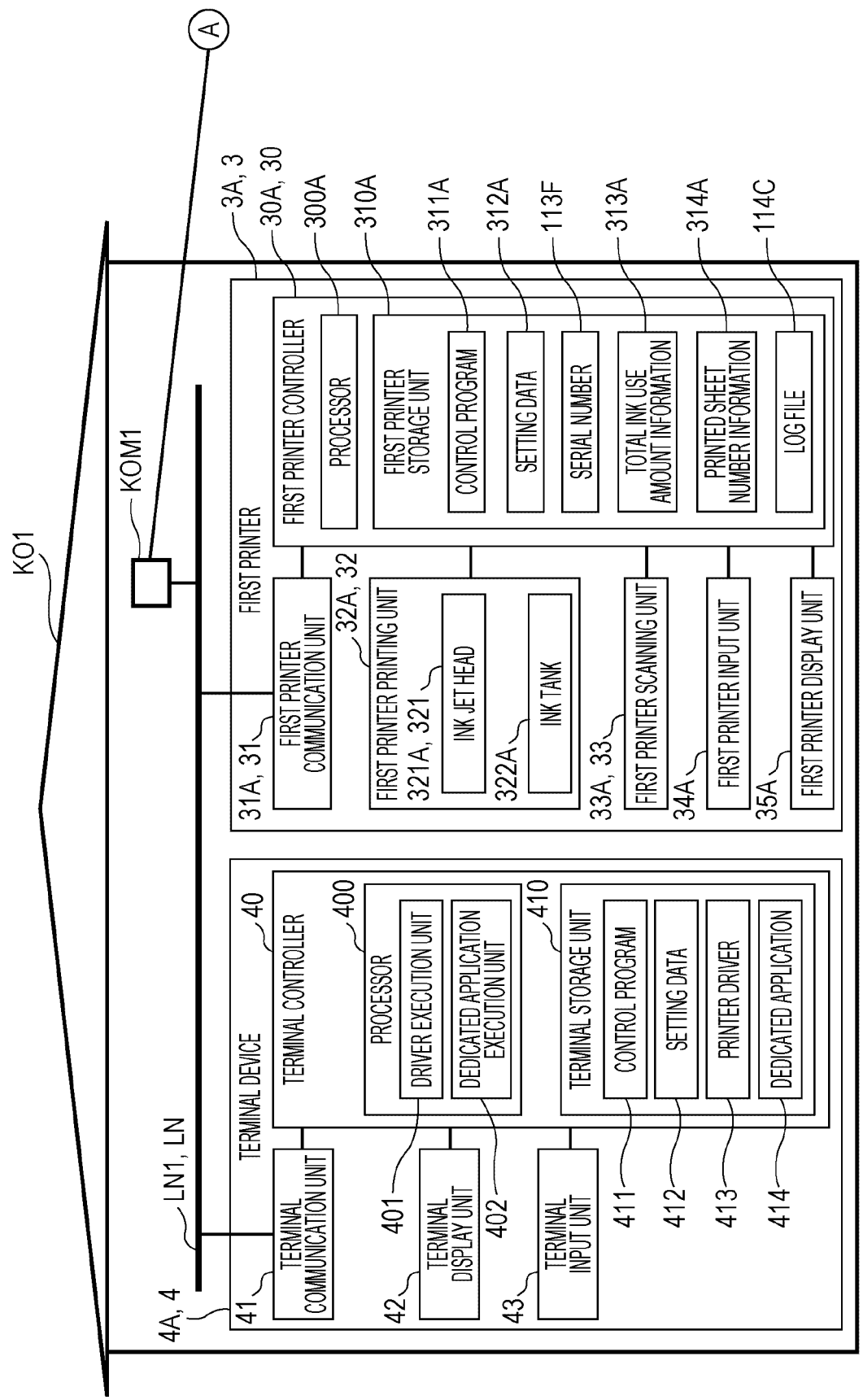

Moreover, respective units shown in FIGS. 2 and 5 are an example, and the present disclosure is not particularly limited to a specific mounting form. That is, it is not necessarily required to implement hardware corresponding to respective units, but it is of course possible to construct a configuration in which the functions of the respective units are implemented by executing a program by one processor. In addition, in the above embodiments, part of the functions implemented by software may be implemented by hardware, or part of the functions implemented by hardware may be implemented by software. In addition, specific detailed configurations of other parts of the service providing system 1000 can be changed in any manner without departing from the scope of the present disclosure.

Further, for example, the step units of the operations shown in FIGS. 6A and 6B, and FIGS. 7A and 7B are divided in accordance with the main processing contents in order to facilitate understanding of the operations of the respective devices of the service providing system 1000. Thus, the present disclosure is not limited to how the process is divided into process units or the names of the process units. Depending on the processing contents, the process may be divided into more step units. Further, one step unit may be divided so as to include more processes. In addition, the order of the steps may be changed as appropriate within the scope of the present disclosure.

What is claimed is:

1. A printing apparatus comprising:
a first function unit that executes a first function using a consumable item;
a second function unit that executes a second function without using the consumable item;
an acquisition unit that acquires status information indicating at least one of a status of a contract for use of a delivery service and a status of payment of a usage fee for the delivery service from an information processing apparatus that provides the delivery service of delivering the consumable item; and
a controller that enables or disables execution by the first function unit of the first function and enables or disables execution by the second function unit of the second function based on at least one of the contract status and the payment status that are indicated by the status information acquired by the acquisition unit,
wherein the controller, when the delivery service is a first delivery service of delivering the consumable item in the printing apparatus lent to a user and the contract status indicated by the status information acquired by the acquisition unit is uncontracted or suspended, or the payment status indicated by the status information acquired by the acquisition unit is unpaid, disables execution by the second function unit of the second function, and
wherein the first function is a print function of printing an image of image data generated by a control device that controls the printing apparatus, and wherein the controller disables the print function and enables a maintenance function related to maintenance of the printing apparatus using the consumable item.

2. The printing apparatus according to claim 1, wherein the controller, when the contract status indicated by the status information acquired by the acquisition unit is uncontracted or suspended, disables execution by the first function unit of the first function.

3. The printing apparatus according to claim 1, wherein the controller, when the payment status indicated by the status information acquired by the acquisition unit is unpaid, disables execution by the first function unit of the first function.

4. The printing apparatus according to claim 1, wherein the controller, when the delivery service is a second delivery service of delivering the consumable item in the printing apparatus purchased by a user, enables execution by the second function unit of the second function.

5. The printing apparatus according to claim 1, wherein the consumable item is ink.

6. The printing apparatus according to claim 1, further comprising:
an ink jet head,
wherein the maintenance function is a function related to maintenance of the ink jet head.

7. The printing apparatus according to claim 1, wherein the maintenance function is a function related to maintenance of a connection to a network to which the information processing apparatus is connected.

8. A service providing system comprising:
a printing apparatus; and
an information processing apparatus that provides a delivery service of delivering a consumable item in the printing apparatus,
wherein the information processing apparatus includes
an information processing apparatus communication unit that communicates with the printing apparatus, and an information processing apparatus controller that transmits, to the printing apparatus through the information processing apparatus communication unit, status information indicating at least one of a status of a contract for use of the delivery service and a status of payment of a usage fee for the delivery service, and wherein the printing apparatus includes a first function unit that executes a first function using the consumable item, a second function unit that executes a second function without using the consumable item, a printing apparatus communication unit that receives the status information from the information processing apparatus, and a controller that receives the status information from the information processing apparatus through the printing apparatus communication unit, and that enables or disables execution by the first function unit of the first function and enables or disables execution by the second function unit of the second function based on at least one of the contract status and the payment status that are indicated by the received status information, wherein the controller, when the delivery service is a first delivery service of delivering the consumable item in the printing apparatus lent to a user and the contract status indicated by the status information acquired by an acquisition unit is uncontracted or suspended, or the payment status indicated by the status information acquired by the acquisition unit is unpaid, disables execution by the second function unit of the second function, and wherein the first function is a print function of printing an image of image data generated by a control device that controls the printing apparatus, and wherein the controller disables the print function and enables a maintenance function related to maintenance of the printing apparatus using the consumable item.

9. A method of controlling a printing apparatus including a first function unit that executes a first function using a consumable item, and a second function unit that executes a second function without using the consumable item, the method comprising:

acquiring status information indicating at least one of a status of a contract for use of a delivery service and a status of payment of a usage fee for the delivery service from an information processing apparatus that provides the delivery service of delivering the consumable item; and enabling or disabling execution by the first function unit of the first function and enabling or disabling execution by the second function unit of the second function based on at least one of the contract status and the payment status that are indicated by the acquired status information, wherein a controller, when the delivery service is a first delivery service of delivering the consumable item in the printing apparatus lent to a user and the contract status indicated by the status information acquired by an acquisition unit is uncontracted or suspended, or the payment status indicated by the status information acquired by the acquisition unit is unpaid, disables execution by the second function unit of the second function, and wherein the first function is a print function of printing an image of image data generated by a control device that controls the printing apparatus, and wherein the controller disables the print function and enables a maintenance function related to maintenance of the printing apparatus using the consumable item.

* * * * *